United States Patent [19]
Guggiari

[11] Patent Number: 5,110,523
[45] Date of Patent: May 5, 1992

[54] METHOD AND APPARATUS FOR MAINTAINING A CONSTANT CONTACT PRESSURE ON ELEMENTS FOR CUTTING UNDER WATER IN GRANULATOR MACHINES

[75] Inventor: Andrea Guggiari, Como, Italy
[73] Assignee: Pomini Farrel S.p.A., Castellanza, Italy
[21] Appl. No.: 570,222
[22] Filed: Aug. 21, 1990

[30] Foreign Application Priority Data

Sep. 19, 1989 [IT] Italy ............... 21759 A/89

[51] Int. Cl.$^5$ ............................. B28B 11/16
[52] U.S. Cl. ...................... 264/40.5; 264/142; 425/67; 425/142; 425/311
[58] Field of Search .......... 425/67, 142, 310, 311, 425/313; 264/142, 40.1, 40.5

[56] References Cited

U.S. PATENT DOCUMENTS

| | | | |
|---|---|---|---|
| 2,775,788 | 1/1957 | Andrew | 264/142 |
| 2,862,243 | 12/1958 | Farr et al. | 264/142 |
| 3,196,487 | 7/1965 | Snelling | 425/67 |
| 3,317,957 | 5/1967 | Heston et al. | 425/67 |
| 3,372,215 | 3/1968 | Muirhead et al. | 264/142 |
| 3,676,029 | 4/1970 | Hopkin | 425/67 |
| 3,912,434 | 10/1975 | Nagahara et al. | 425/142 |
| 4,011,170 | 3/1977 | Pickin et al. | 264/142 |
| 4,123,207 | 10/1978 | Dudley | 425/67 |
| 4,300,877 | 11/1981 | Anderson | 425/313 |
| 4,529,370 | 7/1985 | Holmes et al. | 425/142 |
| 4,614,307 | 9/1986 | Lauser | 425/313 |
| 4,710,113 | 12/1987 | Voigt | 425/67 |
| 4,728,275 | 3/1988 | DiLullo et al. | 425/313 |

Primary Examiner—Jay H. Woo
Assistant Examiner—Robert B. Davis
Attorney, Agent, or Firm—Herbert Dubno

[57] ABSTRACT

The method for maintaining a constant, predetermined contact pressure on elements for cutting under water in granulator machines or applying to the blades of the cutters a force in the opposite direction to a hydrodynamic thrust force, and the apparatus adapted to utilize a control of a constant pressure by actuator means for applying axial thrusts to the drive shaft carriage and the cutters within a slidable bushing and detecting the hydrodynamic thrust force acting on the cutters and regulating the force supplied to the actuators.

10 Claims, 2 Drawing Sheets

METHOD AND APPARATUS FOR MAINTAINING A CONSTANT CONTACT PRESSURE ON ELEMENTS FOR CUTTING UNDER WATER IN GRANULATOR MACHINES

FIELD OF THE INVENTION

The present invention relates to a method of controlling and keeping constant at a predetermined value the contact pressure of cutting elements against a die in granulator machines for cutting under water, and the relevant control and actuation device for implementing the method.

BACKGROUND OF THE INVENTION

There are known in the art machines having granulating heads for cutting under water, composed basically of a chamber closed on one side by a die and traversed axially by a revolving shaft, to which are firmly secured cutting elements composed basically of shaped blades which, brought into contact with the die and set in rotation by the shaft, carry out the cutting of the material.

To this chamber, the plastics material to be granulated, which is in the softened state, is fed through the die. At the same time a strong current of water is caused to flow inside the sealed chamber, in a direction transverse to the axis of the shaft and of the die. The flow of water has the dual purpose of cooling the plastics material leaving the die to make it suitable for cutting into granules and, once the cutting has been carried out, of removing the granulated material from this chamber by bringing it into the next processing zone.

Because the cutting of the material must be carried out in contact with the die and the contact must be the most uniform and constant possible, it is usual, in the present state of the art, to subject the cutters to a preloaded thrust adapted for achieving the contact, the thrust being applied by various means, after the correct positioning of the cutters relative to the die has been achieved by means of suitable mechanical sliding and stopping means.

All the efforts of the prior art have, however, been directed towards assuring the thrust against the die even, for example, by introducing a compression spring against the die itself. It has, however, been found that the cutters when set in rotation and immersed in the water generate a hydrodynamic force substantially proportional to the square of the speed of rotation of the cutters, to the shape of the cutters themselves and to their number.

The hydrodynamic force has two components: a first component parallel to the die and responsible for the resistant torque on the cutters, and a second component perpendicular to the die, which induces a reaction force of the water itself, tending to exert a thrust on the blades towards the die, greater by about one order of magnitude than the thrust applied by the aforementioned prestressed spring.

Because the quality of cutting, the wear of the blades and, above all, the wear of the die, which is the most expensive component, are substantially dependent upon the contact force between the blades and the die, the technical problem arises of balancing, from one moment to the next, the axial component of the hydrodynamic force for the purpose of avoiding deterioration of the quality of cut and excessive wear of the die, by keeping only the constant prestressing force which, for some applications, could even be zero.

OBJECTS OF THE INVENTION

It is therefore the principal object of the invention to provide a method and apparatus avoiding the drawbacks of the prior art.

Still another object is to provide the method and apparatus controlling the effective force acting in a rotor.

SUMMARY OF THE INVENTION

The results are achieved by the present invention, which provides a method of maintaining a predetermined constant contact pressure on elements for cutting under water in granulator machines constituted of a water chamber, on the walls of which there are present two axial apertures, respectively for mounting a die for feeding of the material to be granulated and for seating a drive shaft integral, at its end inside the chamber, with the element carrying the cutters and, at its end outside the chamber, with actuator means adapted for actuating the drive shaft in the axial direction, the method comprising the following steps of:

bringing the blades of the cutters into bearing against the die, applying to the blades a predetermined thrust force of constant value towards the die, setting the drive shaft in rotation, detecting, instant by instant, the value of the hydrodynamic thrust force generated by the rotation of the cutters in the water and acting upon the cutters towards the die, applying to the blades of the cutters a force in the direction opposite to the hydrodynamic thrust force and having a value equal to the value of same, thereby obtaining a total force acting on the die equal only to the constant value of the prestress force.

The constant prestress force should possess such a value as to absorb any possible variation of the hydrodynamic force around the mean operating value and acting in a direction away from the die.

In the method according to this invention, the instantaneous value of the hydrodynamic force may be obtained indirectly on the basis of the variable element constituted of the rotational speed of the cutters or upon the basis of the power consumption of the motor driving the shaft of the cutters.

Alternatively, the instantaneous value of the hydrodynamic force may be obtained directly by the interposition of appropriate measuring means between the fixed element and the movable element, opposite each other in the axial direction, of the support and control structure for the cutters unit.

The method according to this invention is carried out by a granulator machine for cutting under water, equipped with control and actuation means for a constant pressure on blades of cutters in contact with a die, the cutters are rotationally driven by a drive shaft supported by a first slidable bushing inside a second, fixed bushing and comprises actuator means with relevant feed, this mean is adapted for applying axial thrusts to the slidable bushing, means for detecting the hydrodynamic thrust force acting on the cutters, and with regulator means adapted for regulating the force supplied to the actuators.

Actuators are preferably composed of a pair of double-acting fluid cylinders, preferably supplied from a motor acting on a pair of pumps or the like.

In the machine with a control and actuation device according to this invention, the regulator means are constituted of a pressure regulator which can be adjusted for supplying to a first chamber of the cylinders the pressure corresponding to the prestress force, and of a controllable pressure regulator for supplying, instant by instant, to the second chamber of the cylinders the pressure corresponding to the balancing force for the hydrodynamic thrust.

The detection means are preferably constituted of an electronic circuit adapted in known manner for detecting the rotational speed of the drive shaft and for processing this information by converting it into an electrical signal corresponding to the value of the present hydrodynamic thrust force by carrying out an indirect measurement of the hydrodynamic thrust force or, alternatively, the detection means is constituted of load cells interposed between the fixed shell and the sliding shell which, by directly measuring the hydrodynamic force acting on the cutters, supply at their output an electrical signal adapted to be fed to the control circuit.

In the machine having a control and actuation device, it is also provided that the controllable pressure regulator receives, at its input, both a constant pressure derived from the feed pump and, instant by instant and by means of a digital/analogue converter, a control signal coming from the detection and comparison means and supplies at its output, the second chamber of the cylinders with a pressure corresponding to the force for balancing the present hydrodynamic thrust.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
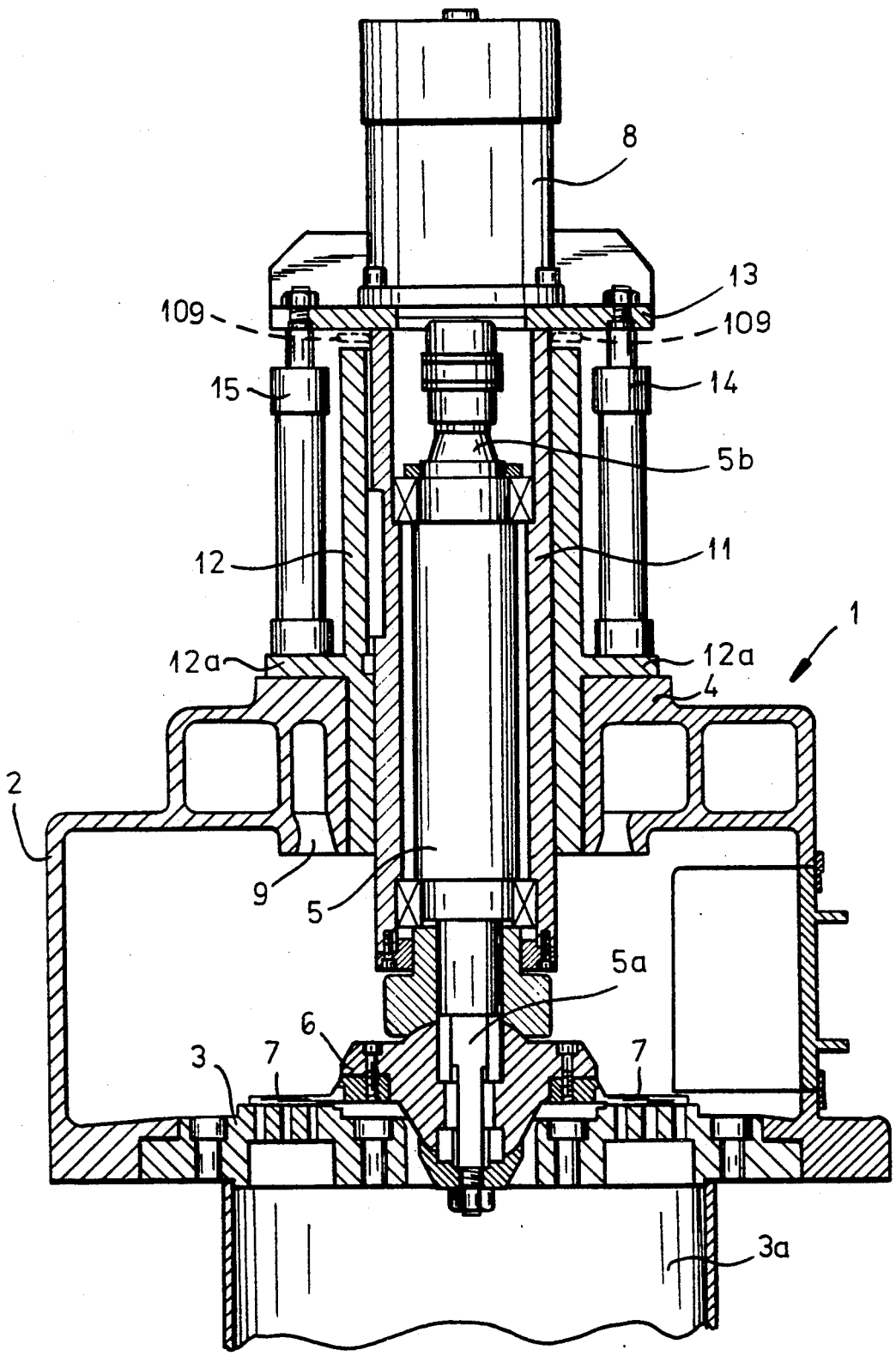
FIG. 1 is an elevational view of the apparatus according to the invention.
Figure 2:
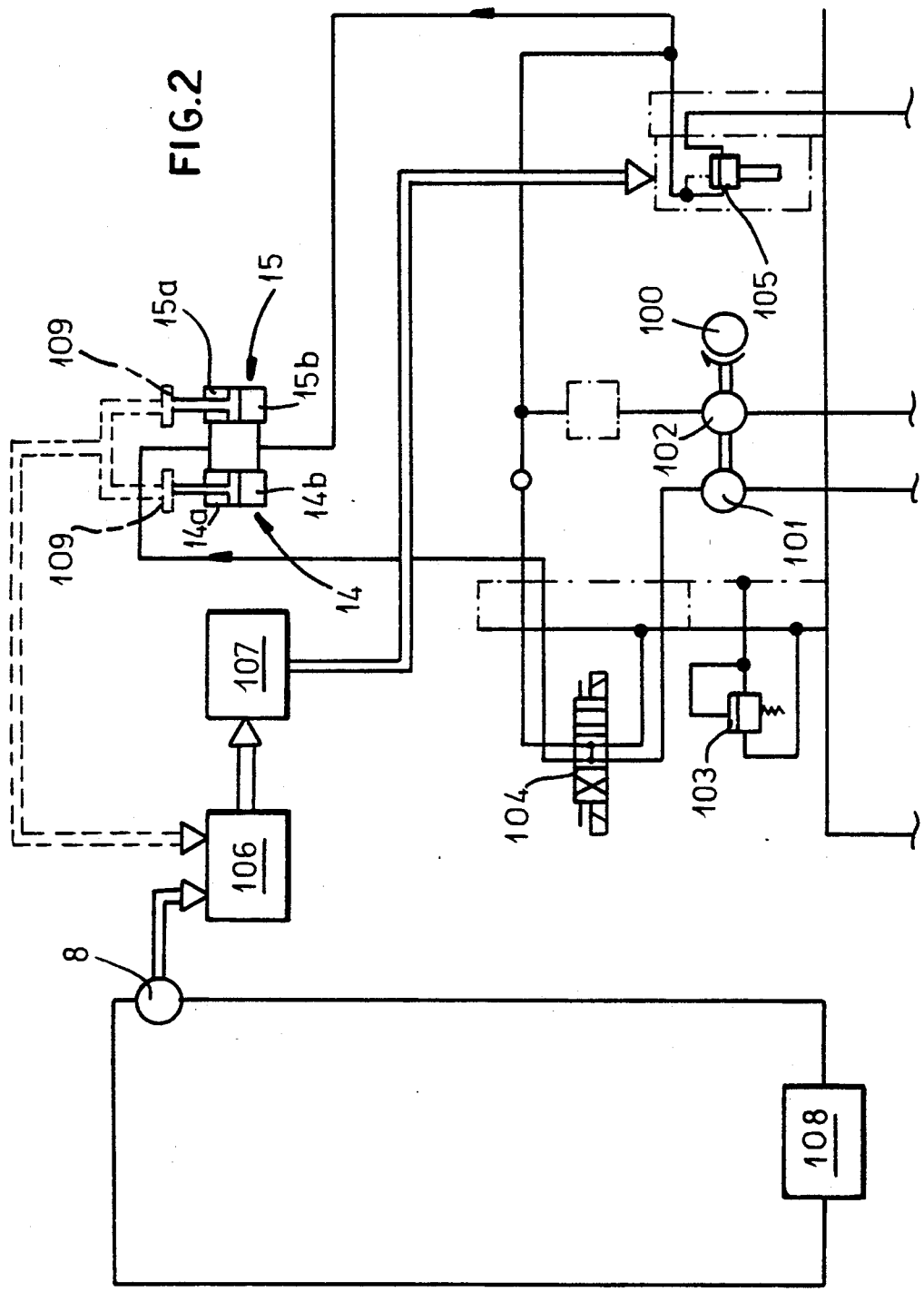
FIG. 2 is a control circuit.

FIG. 1 shows a granulator machine 1 composed of a water chamber 2 formed with two axial opposite apertures, respectively closed by die 3 supplied with softened plastics material through an annular pipe 3a disposed outside of the chamber and by a lid 4 designed for supporting a drive shaft 5, integrally connected at one end 5a inside the chamber 2, with a rotor 6 to which are rigidly secured the cutters 7, variable in number and, at the other end 5b outside the chamber, to a hydraulic motor 8 supplied and driven by an associated circuit shown diagrammatically by the block 108 in FIG. 2 applying the rotary movement to the shaft 5.

The chamber are also formed with apertures 9 for inlet and outlet of the water, disposed in such a way as to cause the water to execute a rotary motion similar to that of the cutters 7, but in a spiral, which causes the water to leave in a direction perpendicular to the cutting direction. In a greater detail, the drive shaft 5 is housed in a bushing 11, slidable along a fixed bushing 12, the latter is integral with the water chamber 2. On the fixed bushing 10 the sliding bushing 11 can slide and in turn, is rigidly attached, at its end outside the chamber, to a transverse flange 13 which also supports the motor 8.

The method of controlling the thrust pressure of the cutters 7 against the die 3 according to this invention consists, essentially, in the phases of bringing the blades of the cutters 7 into contact with the die 3, of applying an axial thrust force and having a predetermined constant value and orientated towards the die, to the shaft 5 carrying the cutters 7; of detecting by means of different components of analytical type the hydrodynamic force produced by the effect of the rotation of the cutters 7 immersed in the water, and of balancing, with an equal and opposite axial thrust, the entire hydrodynamic force in such a manner as to keep only the prestress force, necessary for the maintenance of a correct contact between blades and die, even in the presence of possible turbulence of the water flow which could cause variations in the hydrodynamic force itself during the operation.

The method may be carried out by means of a control and actuation device, an example of embodiment of which will be found in the following description.

The device is composed, essentially, of two double-acting cylinders 14 and 15, rigidly connected at one of their ends to a flange 12a of the fixed shell or bushing 12 and at the other end to the transverse flange 13, in turn rigidly connected to the sliding bushing or shell 11, and of a hydraulic circuit for controlling and supplying the pressure to the cylinders.

With reference to the diagram shown in FIG. 2, the hydraulic control and actuation circuit is composed of a motor 100, which drives a first pump 101 and a second pump 102.

The pump 101 generates a pressure which, set by means of the pressure regulator 103 with the value $P_1$ of the prestress pressure programmed for the specific operating conditions to be fed by means of the valve 104 to the chambers 14a and 15a of the cylinders 14 and 15, causing actuation of the pistons in the direction of thrust against the die 3 and in this way producing the prestress of the cutters 7 against the die 3.

The pump 102, in contrast, generates a much higher pressure, which is fed to the controlled regulator 105.

As the hydraulic motor 8 starts up initiating a rotation of the shaft 5, the electronic circuit comprising a microprocessor 106 is also activated, so as to detect, instant by instant, the rotational speed of the shaft 5 and, on the basis of a preset programme based, for example, on a known analytical function, to calculate the value of the corresponding hydrodynamic force, which acts axially on the cutters.

When the instantaneous value of the hydrodynamic force is detected, a corresponding electrical signal is emitted, which is fed by a digital/analogue circuit 107 to the regulator 105, which supplies a corresponding pressure $P_2$ to the other chamber 14b and 15b of the cylinders 14 and 15, in such a manner as to exert upon the piston an action in the opposite direction to that of the hydrodynamic thrust, thus producing balancing of the undesired hydrodynamic thrust and maintaining of the constant prestress pressure $P_1$.

Alternatively, the detection of the hydrodynamic force may be carried out by means of a direct detection by the use of detection devices of the type, for example, of load cells 109 interposed between the fixed shell or bushing 12 and the transverse flange 13. The load cells emit an electrical signal which is a function of the compression to which they are subjected, which, when fed to the processing circuit 106, enables the desired control of the hydrodynamic force to be carried out in the manner already described.

Another possible variant is the use of an electric motor for driving the cutters, and in this case the detection of the value of the hydrodynamic force could be carried out, again indirectly, on the basis of the power consumption of the motor.

Numerous variants can be introduced to the device according to the present invention, without thereby departing from the scope of the patent in its general characteristics.

I claim:

1. A method for maintaining a constant position of cutter blades against a die for cutting a granular material under water, said method comprising the steps of:
    (a) applying a predetermined thrust to the cutter blades of a cutter for urging same toward a die in a water chamber thereby advancing the cutter blades toward the die;
    (b) bringing the blades into contact with the die with the predetermined thrust;
    (c) rotating the cutter blades thereby generating a hydrodynamic force having a hydrodynamic thrust component directed towards the die;
    (d) at least periodically detecting the hydrodynamic thrust component in response to the rotating of the blades; and
    (e) applying a compensating force to the cutter blades equal to and directed opposite the hydrodynamic thrust component thereby maintaining the predetermined thrust force providing continuous contact between the cutter blades and the die.

2. The method defined in claim 1 wherein said hydrodynamic thrust component is measured upon detecting a rotational speed of the cutter blades.

3. The method defined in claim 1 wherein said hydrodynamic thrust component is measured upon detecting a power consumption of a motor driving the cutter blades.

4. The method defined in claim 1 wherein said hydrodynamic thrust component is detected upon measuring a pressure force including the predetermined thrust force combined with the hydrodynamic thrust component acting upon the cutter blades.

5. A granulating machine for cutting a material under water, comprising:
    means forming a water chamber provided with outer and inner coaxial openings;
    a shaft mounted axially slidable on said chamber and rotatable about an axis, said shaft being formed with an outer end extending outwardly through said outer opening and with an inner end in said chamber;
    a plurality of cutting blades mounted on said inner end of said shaft;
    a die juxtaposed with said water chamber and closing said inner opening for communicating with said cutting blades in said chamber;
    actuating means for generating an axial thrust force on said cutting blades directed inwardly towards said die, said actuating means comprising:
    means for rotating said shaft,
    a first bushing coaxial with and supporting said shaft rotatable therein,
    a second bushing coaxial with said shaft and supporting said first bushing slidable axially in said second bushing axially fixed with said water chamber, and
    thrust means operatively connected with said first bushing for applying a constant axial thrust force to said cutter blades in a first direction toward said die;
    control means for generating a signal in response to rotating of said blades in said water chamber and corresponding to a hydrodynamic thrust force component directed axially inwardly towards said die; and
    regulating means operatively connected with said thrust means for maintaining continuous contact between said cutter blades and said die, said regulating means generating a signal corresponding to a compensating force equal to said hydrodynamic thrust force component and applied to said cutter blades in a second axial direction opposite said first one in response to said signal of the control means, so that said blades and said die are in the continuous contact with each other upon applying said constant axial force.

6. The machine defined in claim 5 wherein said thrust means are a pair of double acting fluid-operated cylinders.

7. The machine defined in claim 5 wherein said regulating means comprises:
    a motor,
    first and second pumps driven by said motor,
    a first pressure regulator connected with said pump and supplying a pressure to said thrust means corresponding to said constant axial thrust force, and
    a controllable pressure regulator provided with an input receiving a control signal generated by said control means and with an output applying a second pressure directed oppositely said first pressure in said thrust means and corresponding to said compensating force.

8. The machine defined in claim 5 wherein said control means is electronic means for detecting a rotational speed of said shaft and for converting it into an electrical signal corresponding to said hydrodynamic thrust force component.

9. The machine defined in claim 7 wherein said control signal is corresponding to a difference between said constant axial thrust force applied to said thrust means and a force resulted from a combined action of said constant axial thrust force and of said hydrodynamic force component.

10. The machine defined in claim 5 wherein said control means is a pair of load cells operatively connected with said thrust means for detecting said hydrodynamic thrust force component.

* * * * *